(No Model.)
C. ACKERMAN.
COFFEE MAKING POT OR UTENSIL.
No. 498,098. Patented May 23, 1893.
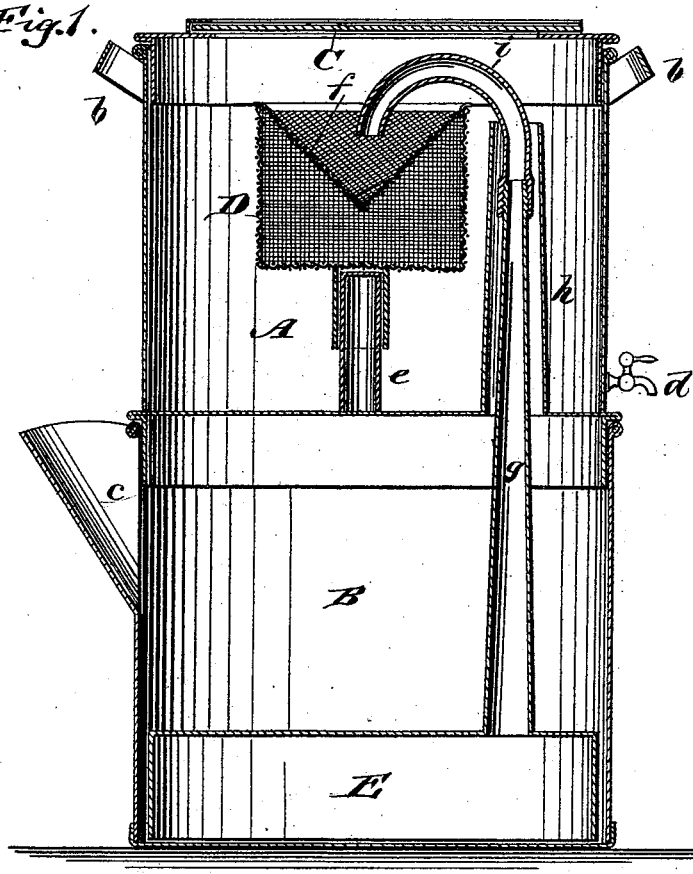
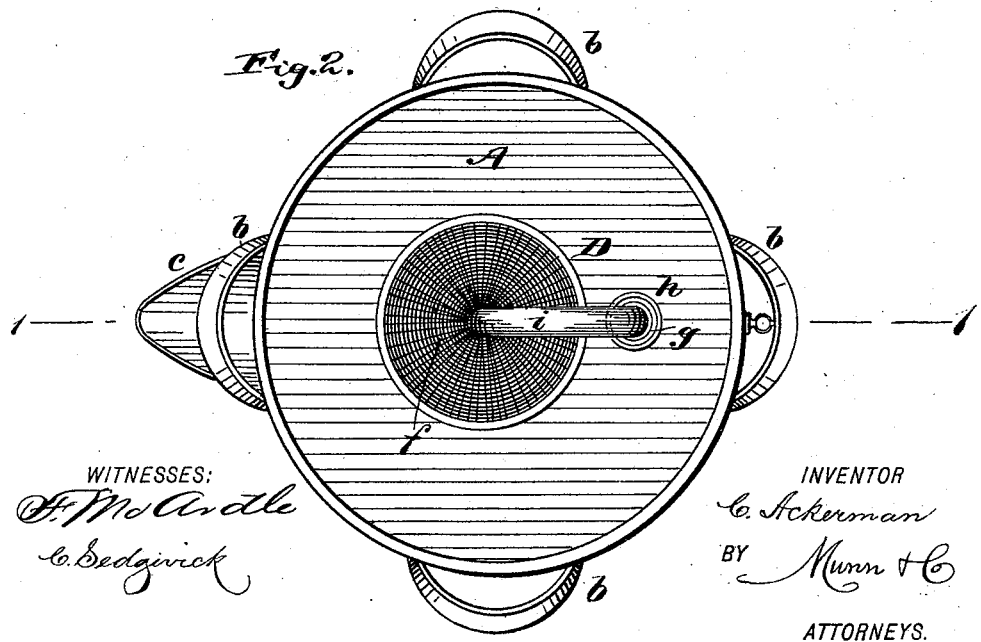
WITNESSES:
F. McArdle
C. Sedgwick
INVENTOR
C. Ackerman
BY Munn & Co
ATTORNEYS.

UNITED STATES PATENT OFFICE.

CORDULA ACKERMAN, OF PEKIN, ILLINOIS.

COFFEE-MAKING POT OR UTENSIL.

SPECIFICATION forming part of Letters Patent No. 498,098, dated May 23, 1893.

Application filed July 22, 1892. Serial No. 440,871. (No model.)

*To all whom it may concern:*

Be it known that I, CORDULA ACKERMAN, of Pekin, in the county of Tazewell and State of Illinois, have invented certain new and useful Improvements in Coffee-Making Pots or Utensils, of which the following is a full, clear, and exact description.

This invention consists in an apparatus or utensil for making coffee, of novel construction substantially as hereinafter described and more particularly pointed out in the claims.

Reference is to be had to the accompanying drawings forming a part of this specification, in which similar letters of reference indicate corresponding parts in both the figures.

Figure 1 is a vertical section, upon the line 1—1 in Fig. 2, of a coffee making utensil or apparatus embodying my invention; and Fig. 2 is a plan of the same, with its lid removed.

The utensil, which is preferably made of tinned metal so as to avoid the formation of verdigris or accumulation of other unhealthy substance in or on it, consists mainly of two compartments or chambers A and B, arranged one above the other each distinct from the other, and the upper part or compartment A sitting on or resting in the top of the lower part or compartment B. Each of these compartments may be provided with handles $b$, for separately handling them and the upper compartment be provided with a glazed lid C, to facilitate viewing the operation of making the coffee without opening the utensil or exposing the coffee to cooling and loss of aroma. The lower compartment or chamber B is a reservoir for hot water and steam used in infusing and making the coffee and may be provided with a spout $c$. The upper part or chamber A is a reservoir for the coffee and contains within it a perforated metal sieve-like receptacle D, in which the ground coffee to be infused is placed and through which the liquid coffee percolates and passes into the main body of the compartment A from which it may be drawn, when required to be used, by a faucet $d$. The perforated or reticulated receptacle D, which is shown mounted upon a stem $e$ in the compartment A and made removable therefrom to facilitate cleaning, is preferably of cylindrical shape with a funnel or inverted conical top $f$, entering down within the body of the receptacle to receive and hold the ground coffee to be infused. This top $f$ as well as the body of the receptacle D is of perforated or reticulated construction, and the whole forms an inside and outside or double screen to sift the coffee under infusion, which dispenses with the use of all cloth or rags for the purpose, and consequently is much cleaner and healthier.

The steam and hot water compartment B has fitted loosely within it a close metal hot water retainer E, open at its bottom and provided on its top with a tube $g$, which passes upward loosely through a sleeve $h$, in the upper compartment A and has, on its top, a bent spout $i$, that passes the steam and water, as it is forced from under the retainer E and up through the tube $g$, on to the coffee in the receptacle D for the purpose of infusing the coffee.

A coffee making apparatus or utensil thus constructed will be very saving as regards waste of coffee and will make stronger coffee and of better aroma, inasmuch as the utensil is substantially air-tight. The hot water as it is evaporated can be readily replaced or replenished, and it does not require a person or child of more than ordinary knowledge to use or work the utensil, which is very simple. Furthermore, as the apparatus is continuous and self-feeding so far as the infusion of the coffee is concerned, no time need be lost in boiling the coffee which can be kept warm for a long time, as the hot water in the lower compartment B keeps the coffee hot without cooking it over again, and on this account the utensil will be found very useful in hotels, restaurants and other places where warm meals are wanted at all hours.

The utensil may also be used for making other beverages or infusions besides coffee.

Having thus described my invention, I claim as new and desire to secure by Letters Patent—

1. A coffee making pot, comprising the lower compartment B, the upper compartment A, detachably fitting the lower compartment, the reticulated receptacle D held in the upper compartment, the hot water retainer E, seated in the lower compartment and having an upwardly extending tube passed into the upper compartment and projected into the receptacle D, and the removable cover C having a glazed opening, all arranged substantially in the manner shown and for the purpose described.

2. In a coffee making vessel, the combination with the upper and lower compartments A and B detachably joined, the compartment A having a member e extended up from its bottom, and the reticulated receptacle D, detachably held on the member e, of the hot water retainer E seated on the bottom of the lower compartment B, and formed with a tube g extended up into the upper compartment A and projected into the receptacle D and the detachable cover C all arranged substantially in the manner shown and described.

CORDULA ACKERMAN.

Witnesses:
   JULIA SCHAETTLE,
   GEO. SCHAETTLE.